US007290100B2

(12) United States Patent
Achiwa et al.

(10) Patent No.: US 7,290,100 B2
(45) Date of Patent: Oct. 30, 2007

(54) COMPUTER SYSTEM FOR MANAGING DATA TRANSFER BETWEEN STORAGE SUB-SYSTEMS

(75) Inventors: Kyosuke Achiwa, Odawara (JP); Naoto Matsunami, Hayama (JP); Manabu Kitamura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 163 days.

(21) Appl. No.: 10/435,260

(22) Filed: May 12, 2003

(65) Prior Publication Data

US 2003/0221075 A1 Nov. 27, 2003

(30) Foreign Application Priority Data

May 10, 2002 (JP) ............................ 2002-134838

(51) Int. Cl.
*G06F 12/16* (2006.01)
(52) U.S. Cl. .................................... 711/162
(58) Field of Classification Search ................ 711/162
See application file for complete search history.

(56) References Cited

U.S. PATENT DOCUMENTS

| 5,742,792 | A | | 4/1998 | Yamai |
| 5,819,292 | A | | 10/1998 | Hitz |
| 5,881,311 | A | * | 3/1999 | Woods ........................... 710/4 |
| 5,905,983 | A | * | 5/1999 | Inomata et al. ................. 707/4 |
| 6,148,414 | A | * | 11/2000 | Brown et al. ................... 714/9 |
| 6,189,079 | B1 | * | 2/2001 | Micka et al. ................ 711/162 |
| 6,212,531 | B1 | * | 4/2001 | Blea et al. .................. 707/204 |
| 6,230,246 | B1 | * | 5/2001 | Lee et al. .................... 711/167 |
| 6,260,124 | B1 | * | 7/2001 | Crockett et al. ............. 711/162 |
| 6,324,654 | B1 | * | 11/2001 | Wahl et al. ..................... 714/6 |
| 6,353,878 | B1 | * | 3/2002 | Dunham ...................... 711/162 |
| 6,360,306 | B1 | * | 3/2002 | Bergsten ...................... 711/162 |
| 6,466,978 | B1 | | 10/2002 | Mukherjee et al. |
| 6,473,809 | B1 | | 10/2002 | Aref et al. |
| 6,606,690 | B2 | | 8/2003 | Padovano |
| 6,622,220 | B2 | | 9/2003 | Yoshida et al. |
| 6,871,234 | B1 | * | 3/2005 | Minakuchi et al. .......... 709/231 |
| 2001/0029512 | A1 | * | 10/2001 | Oshinsky et al. ............ 707/204 |
| 2001/0047460 | A1 | * | 11/2001 | Kobayashi et al. .......... 711/162 |

(Continued)

FOREIGN PATENT DOCUMENTS

JP 2001134385 5/2001

OTHER PUBLICATIONS

"Easy-To-Manage Networks", pp. 54-55 of "Nikkei Electronics 6th Nov. 2000 (No. 783" published by Nikkei BP Inc. (in Japanese language attached with English translation).

*Primary Examiner*—Matthew Kim
*Assistant Examiner*—Sheng-Jen Tsai
(74) *Attorney, Agent, or Firm*—Mattingly, Stanger, Malur & Brundidge, P.C.

(57) ABSTRACT

The source storage 1220 and source path 1230 constituting backup source information of all of the backup data in a computer system 1000, the destination storage 1240 and destination path 1250 constituting backup destination information and information regarding the backup time-point 1260 are held on an administration console 1010; a backup manager 1020 that runs on the administration console 1010 designates backup between the NAS's and gives instructions for restoration from the backed-up data by using these items of information.

2 Claims, 14 Drawing Sheets

U.S. PATENT DOCUMENTS

| | | |
|---|---|---|
| 2002/0013832 A1 | 1/2002 | Hubbard |
| 2002/0114273 A1* | 8/2002 | Tobita et al. ............... 370/229 |
| 2002/0156984 A1 | 10/2002 | Padavano |
| 2003/0005119 A1 | 1/2003 | Mercier et al. |
| 2003/0009438 A1 | 1/2003 | Achiwa et al. |
| 2003/0055943 A1 | 3/2003 | Kanai |
| 2003/0110263 A1 | 6/2003 | Shillo |
| 2003/0115447 A1 | 6/2003 | Pham et al. |
| 2003/0120751 A1 | 6/2003 | Husain et al. |
| 2003/0135650 A1 | 7/2003 | Kano et al. |
| 2003/0145086 A1 | 7/2003 | O'Reilly |
| 2003/0154314 A1 | 8/2003 | Mason, Jr. et al. |
| 2003/0187885 A1 | 10/2003 | Miyazaki et al. |
| 2003/0212777 A1 | 11/2003 | Kandefer et al. |
| 2003/0229651 A1 | 12/2003 | Mizuno et al. |
| 2004/0059822 A1 | 3/2004 | Jiang et al. |
| 2004/0078466 A1 | 4/2004 | Coates et al. |
| 2004/0088297 A1 | 5/2004 | Coates et al. |

* cited by examiner

FIG.5

CURRENT TIME POINT: 123456

|  | ENTRY a 1800 | ENTRY b 1810 | ENTRY c 1820 | ENTRY d 1830 |
|---|---|---|---|---|
| SOURCE STORAGE 1220 | NASa | NASa | NASd | NASd |
| SOURCE PATH 1230 | /tako | /tako | /tai | /tai |
| DESTINATION STORAGE 1240 | NASb | NASc | NASa | NASc |
| DESTINATION PATH 1250 | /ebi | /uni | /ika | /iwashi |
| BACKUP TIME-POINT 1260 | 123452 | 123389 | 123333 | 123444 |
| BACKUP FREQUENCY 1270 | 10 | 100 | -1 | 30 |

FIG.14

CURRENT TIME POINT:123456

|  | ENTRY e 1840 | ENTRY f 1850 | ENTRY g 1860 | ENTRY h 1870 |
|---|---|---|---|---|
| SOURCE STORAGE 1220 | DISK a | DISK a | DISK d | DISK d |
| SOURCE PATH 1230 | VOLUME a | VOLUME c | VOLUME g | VOLUME h |
| DESTINATION STORAGE 1240 | DISK b | DISK c | DISK a | DISK c |
| DESTINATION PATH 1250 | VOLUME d | VOLUME e | VOLUME b | VOLUME f |
| BACKUP TIME-POINT 1260 | 123452 | 123389 | 123333 | 123444 |
| BACKUP FREQUENCY 1270 | 10 | 100 | -1 | 30 |

COMPUTER SYSTEM FOR MANAGING DATA TRANSFER BETWEEN STORAGE SUB-SYSTEMS

BACKGROUND OF THE INVENTION

1. Field of the Invention

The present invention relates to techniques for data management during backup of data between storage sub-systems.

2. Description of the Related Art

The technique of employing a remote computer is available as a technique for performing data copying between storage sub-systems.

The remote computer performs data copying through a network between a plurality of storage sub-systems in a physically remote location without interposition of a computer connected to the storage sub-systems.

With the remote computer technique, a duplicated condition of the shared storage region is always maintained between the storage sub-system that is the source of copying and the storage sub-system that is the target of the copying. Techniques relating to use of a remote computer are disclosed in U.S. Pat. No. 5,742,792.

In addition, the snapshot technique is available, in which a Point in Time Image is created of the storage region provided on the storage sub-system at a given point in time.

The image of the storage region created by the snapshot (hereinbelow termed the "snapshot volume") is held independently of the original storage region. An image of the storage region is therefore held during creation of the snapshot. The snapshot technique is disclosed in U.S. Pat. No. 5,819,292.

NAS (Network Attached Storage), which is a storage sub-system connected to the network and that processes file-level access requests, is also available. NAS has a file system and can process access requests from a computer in respect of a file or directory.

There is a description of NAS at pages 54 and 55 of "Nikkei Electronics 6th Nov., 2000 (No. 782)" published by Nikkei BP Inc.

SUMMARY OF THE INVENTION

Using a remote computer or snapshot technique as described above, a copy of the storage region provided on a storage sub-system can be created on a plurality of storage sub-systems.

However, when a plurality of copied data items (hereinbelow called "backup data") were present distributed to a plurality of storage sub-systems, conventionally, it was not possible to manage the plurality of backup data items in an integrated fashion.

Furthermore, when a plurality of storage sub-systems connected to a network, such as an SAN (storage area network) have backup data in a plurality of other storage sub-systems, conventionally, it is not possible to manage the backup data present in the network in an integrated fashion.

A construction for solving the above problems is as follows. Specifically, a computer for backup management comprising information for managing the transfer of data such as the backup source, backup destination and backup time (or version) information of backup data distributed on a network is provided on a network.

Furthermore, as a preferred embodiment, a construction may be envisioned wherein, when the administrator attempts to restore the data of a backup source from a plurality of backup data items, the computer for backup management causes the administrator to select the sub-system and data that are to constitute the source for restoration by presenting to the administrator information regarding the plurality of backed-up data items, together with the time-points at which the backups were made, so that the data of the backup source can be restored from the selected data.

BRIEF DESCRIPTION OF THE DRAWINGS

FIG. 5 is a view showing an example of a backup management table according to a first embodiment;

FIG. 14 is a view showing an example of a backup management table according to a second embodiment.

DESCRIPTION OF THE PREFERRED EMBODIMENTS

Figure 1:
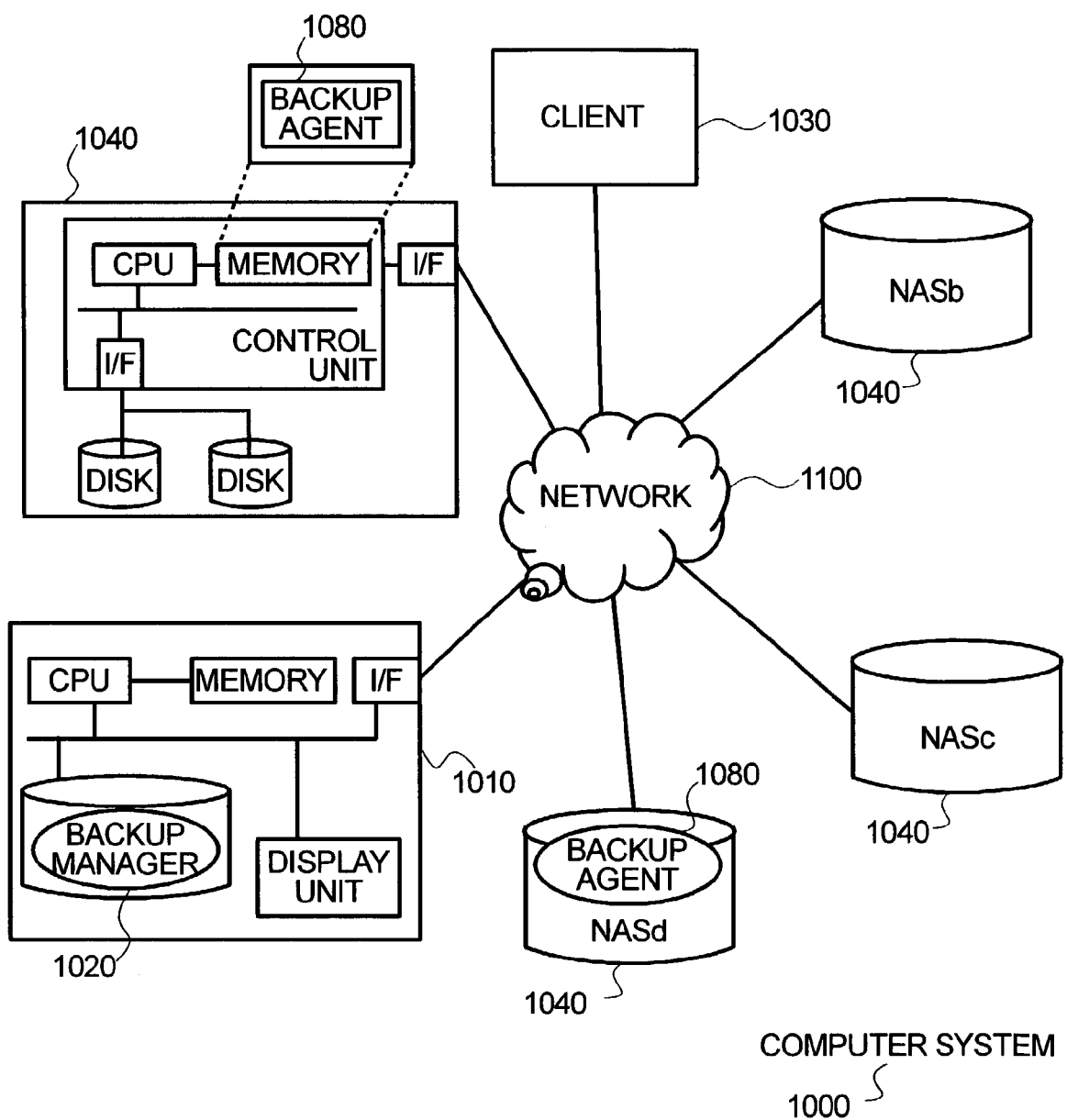
FIG. 1 is a view showing the layout of a computer system according to a first embodiment.

FIG. 1 is a view showing a first embodiment of a computer system.

A computer system 1000 comprises a computer employed by a client (hereinbelow called "client") 1030, an NAS 1040, which is a type of storage sub-system, a computer for administration purposes (hereinbelow called "administration console") 1010 and a network 1100 that connects these devices.

The client 1030 issues a file access request in respect of another device connected with the network 1100. A file access request is a request for performing access to data stored on a storage sub-system or the like under a file name.

In this embodiment, four NAS's 1040, specifically, NASa, NASb, NASc and NASd are connected with the network 1100.

The NAS 1040 are provided with a plurality of disk devices and control units that control the plurality of disk devices and file systems and interfaces with external devices. The control unit may manage the plurality of disk devices as a disk array or may manage these devices as just a bunch of disks (JBOD). However, the number of NAS 1040 disk devices could be merely a single one. Also, the control unit could be divided into a control unit for managing the file system and a control unit for managing a plurality of disk devices. The control unit comprises a CPU that executes a program and a memory in which the program is stored.

Also, the control units NASa and NASd perform backup processing by executing a backup agent 1080, which is a program stored in memory, in accordance with instructions from the administration console 1010. However, it is not necessary that the number of NAS's 1040 provided with the backup agent 1080 should be restricted to two only.

The administration console 1010 manages the backup of data in the computer system 1000. The administration console 1010 comprises a CPU, memory, disk device, display unit and external interface. A backup manager 1020 is stored in the disk device. The administration console 1010 manages backup of data in the computer system 1000 by fetching the backup manager 1020 in memory and executing the backup manager 1020 by the CPU. The backup manager 1020 may be installed on the disk device through the interface.

Figure 2:
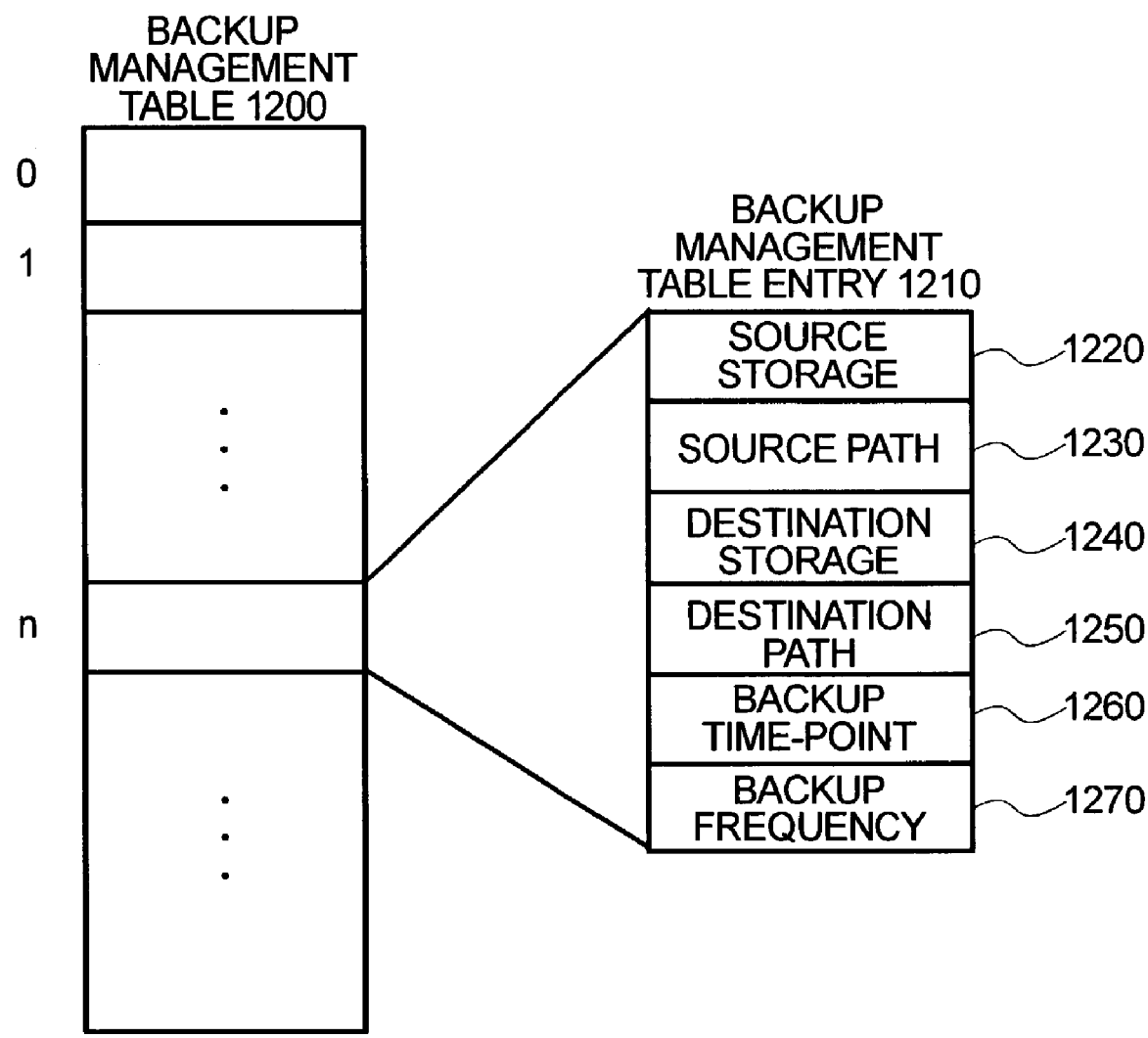
FIG. 2 is a view showing a backup management table.

FIG. 2 is a view showing a backup management table 1200 stored in the memory of the administration console 1010. The administration console 1010 manages the backup relationship of the data in the computer system 1000 using the backup management table 1200.

The backup management table 1200 comprises a plurality of backup management table entries 1210. In addition, the backup management table entries 1210 comprise the entries: source storage entry 1220, source path entry 1230, destination storage entry 1240, destination path entry 1250, backup time-point entry 1260 and backup frequency entry 1270. Information for associating the backup source storage region and the backup destination storage region is stored in each individual backup management table entry 1210.

Information indicating the NAS 1040 that is the backup source and the path of the directory of the file system that is to be backed up is registered in the source storage entry 1220 and source path entry 1230. Information indicating the NAS 1040 that is the backup destination and the path of the directory of the file system where this backup data is stored is stored in the destination storage entry 1240 and destination path entry 1250.

Information indicating the last time-point at which the directory of the NAS 1040 specified by the information stored in the source storage entry 1220 and the source path entry 1230 was backed up is stored in the backup time-point entry 1260. Information indicating the frequency of execution of the backup processing when backup of the directory of the NAS 1040 is performed periodically is stored by a value of which units are minutes in the backup frequency entry 1270.

If the value of the source storage entry 1220 is null (i.e. no value is entered), this backup management table entry 1210 is invalid i.e. it constitutes an empty entry. The number of entries 1210, excluding empty entries, is identical with the number of backup combinations present in the system 1000. If a given NAS 1040 directory is backed up to a plurality of NAS's 1040, there are a plurality of backup management table entries 1210 in the table, having the same values stored in the source storage entry 1220 and source path entry 1230 but different values stored in the destination storage entry 1240 and destination path entry 1250.

Also, if the value −1 is stored in the backup frequency entry 1270, backup is only performed when instructed by the administration console 1010, instead of being performed periodically.

Figure 3:
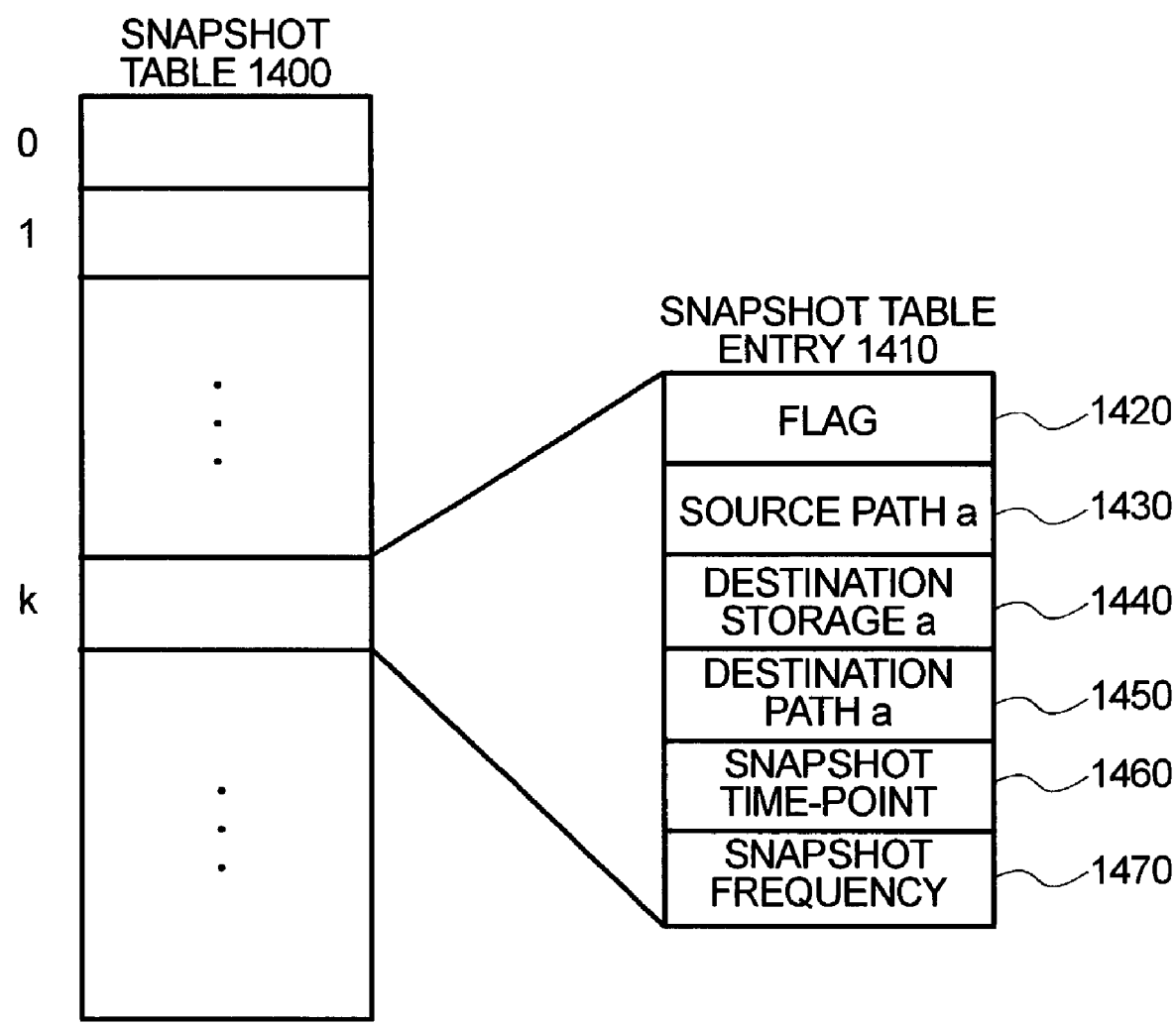
FIG. 3 is a view showing a snapshot management table.

FIG. 3 is a snapshot table 1400 stored in the memory of an NAS 1040. The snapshot table 1400 holds information relating to the backup instruction received from the administration console 1010. NASa and NASd perform backup processing by specifying the storage regions of the backup source and backup destination in accordance with the information stored in the snapshot table 1400.

"Backup" in this embodiment means that a given NAS 1040 creates a snapshot image of the directory that is to be backed up in another NAS 1040.

The snapshot table 1400 comprises a plurality of snapshot table entries 1410. Each respective snapshot table entry 1410 comprises a flag entry 1420, a source path a entry 1430, a destination storage a entry 1440, a destination path a entry 1450, a snapshot time-point entry 1460 and a snapshot frequency entry 1470.

The flag entry 1420 stores information indicating whether or not a snapshot has been created. For example, if the value stored in the flag entry 1420 is 0, the snapshot table entry 1410 including this flag entry 1420 is invalid, or is an empty entry. If the value of the flag entry 1420 is 1, a snapshot image of the directory corresponding to the snapshot table entry 1410 exists in another NAS 1040.

If the value of the flag entry 1420 is 2, a snapshot image of the directory corresponding to the snapshot table entry 1410 is in the course of being created in another NAS 1040. If the value of the flag entry 1420 is 3, this indicates that a snapshot image of the directory corresponding to the snapshot table entry 1410 has not yet been created.

The source path a entry 1430 stores information indicating the directory of the NAS 1040 that is to be backed up. The destination storage a entry 1440 and the destination path a entry 1450 store information indicating the NAS 1040 and the directory constituting the backup destination in this NAS 1040. The snapshot time-point entry 1460 stores information indicating the time-point of the last backup for the directory corresponding to the snapshot table entry 1410. If the value of the snapshot time-point entry 1460 is 0, this means that no backup has yet been made.

The snapshot frequency entry 1470 stores the value, in units of minutes, of information indicating the frequency, if the corresponding directory is periodically backed up. If the value of the snapshot frequency entry 1470 is 0, this indicates that no periodic backup of the corresponding directory is performed.

Figure 4:
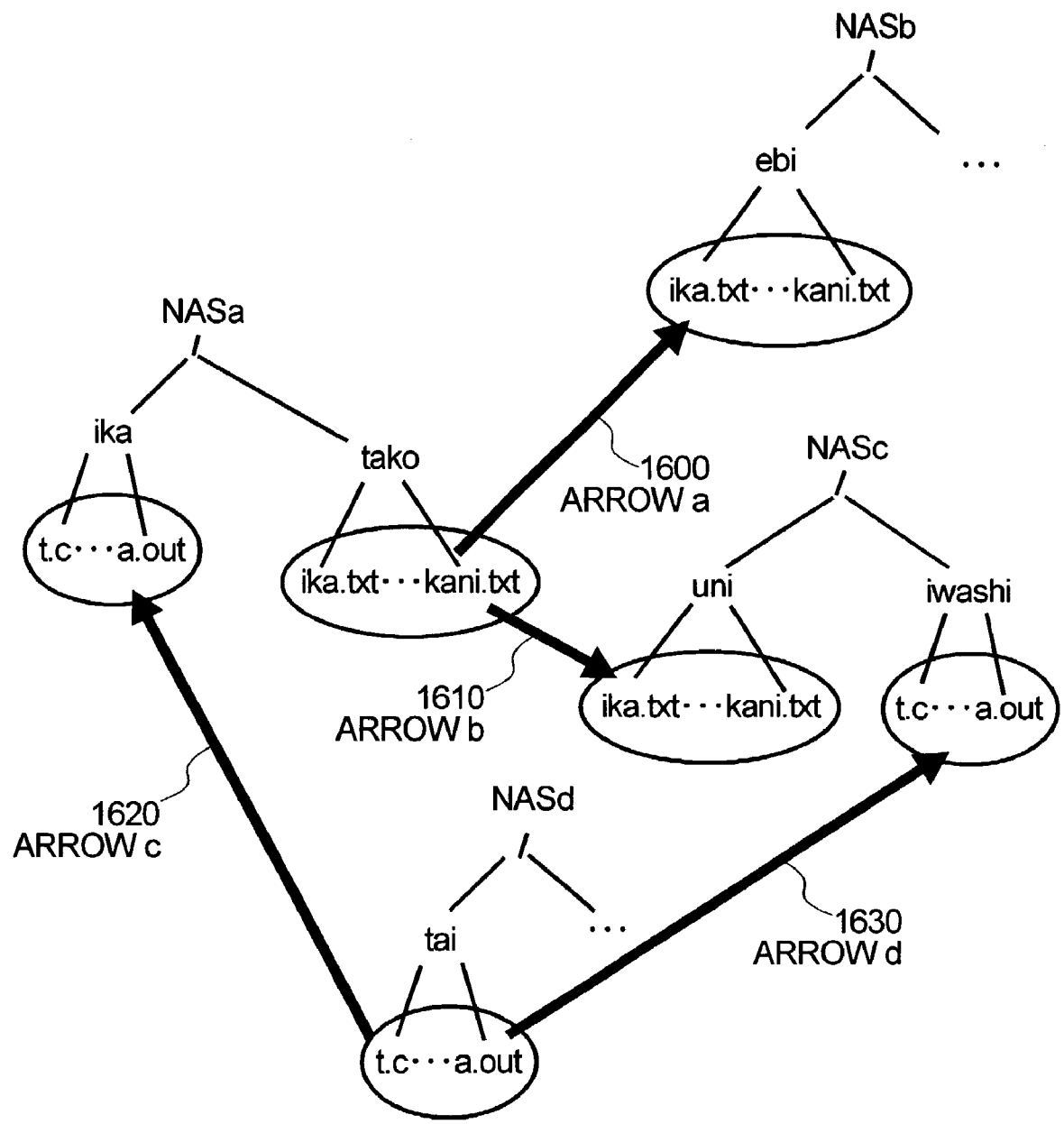
FIG. 4 is a view showing the backup relationship between NAS's.

FIG. 4 is a diagram showing the backup relationship between NAS's 1040 in this embodiment.

In FIG. 4, the arrow a1600 and the arrow b1610 signify that the files that are stored in the directory /tako of NASa are respectively backed up in the directory /ebi of NASb and the directory /uni of NASc.

Likewise, the arrow c1620 and the arrow and d1630 signify that the directory /tai of NASd is backed up to the directory /ika of NASa and the directory /iwashi of NASc.

FIG. 5 is a view showing the backup management table entry 1210 of the administration console 1010 when the backup relationship of this embodiment is that of FIG. 4. The entry a1800 is the entry 1210 corresponding to the arrow a1600 of FIG. 4. The items of information "NASa" and "/tako" respectively are stored in the source storage entry 1220 and the source path entry 1230. The items of information "NASb" and "/ebi" respectively are stored in the destination storage entry 1240 and the destination path entry 1250.

It should be noted that the backup time-point entry 1260 stores the information "123452" i.e. that the time-point at which backup was previously performed was four minutes prior to the current time-point 123456. Also, the backup frequency entry 1270 stores information indicating "10 minutes".

The entry b1810 is the entry 1210 corresponding to the arrow b1610. Specifically, the entry b1810 shows that /tako of NASa is backed up every 100 minutes in /uni of NASc and that the time-point when backup was previously performed was 123389.

The entry c1820 is the entry 1210 corresponding to the arrow c1620. Specifically, the entry c1820 signifies that /tai of NASd is backed up to /ika of NASa and that the time-point of the previous backup was 123389. Since the value −1 is entered in the backup frequency 1270, no periodic backup is performed.

The entry d1830 is the entry 1210 corresponding to the arrow d1630. Specifically, the entry d1830 indicates that /tai of NASd is backed up every 30 minutes to /iwashi of NASc and that the time-point when the previous backup was performed is 123444.

Figure 6:
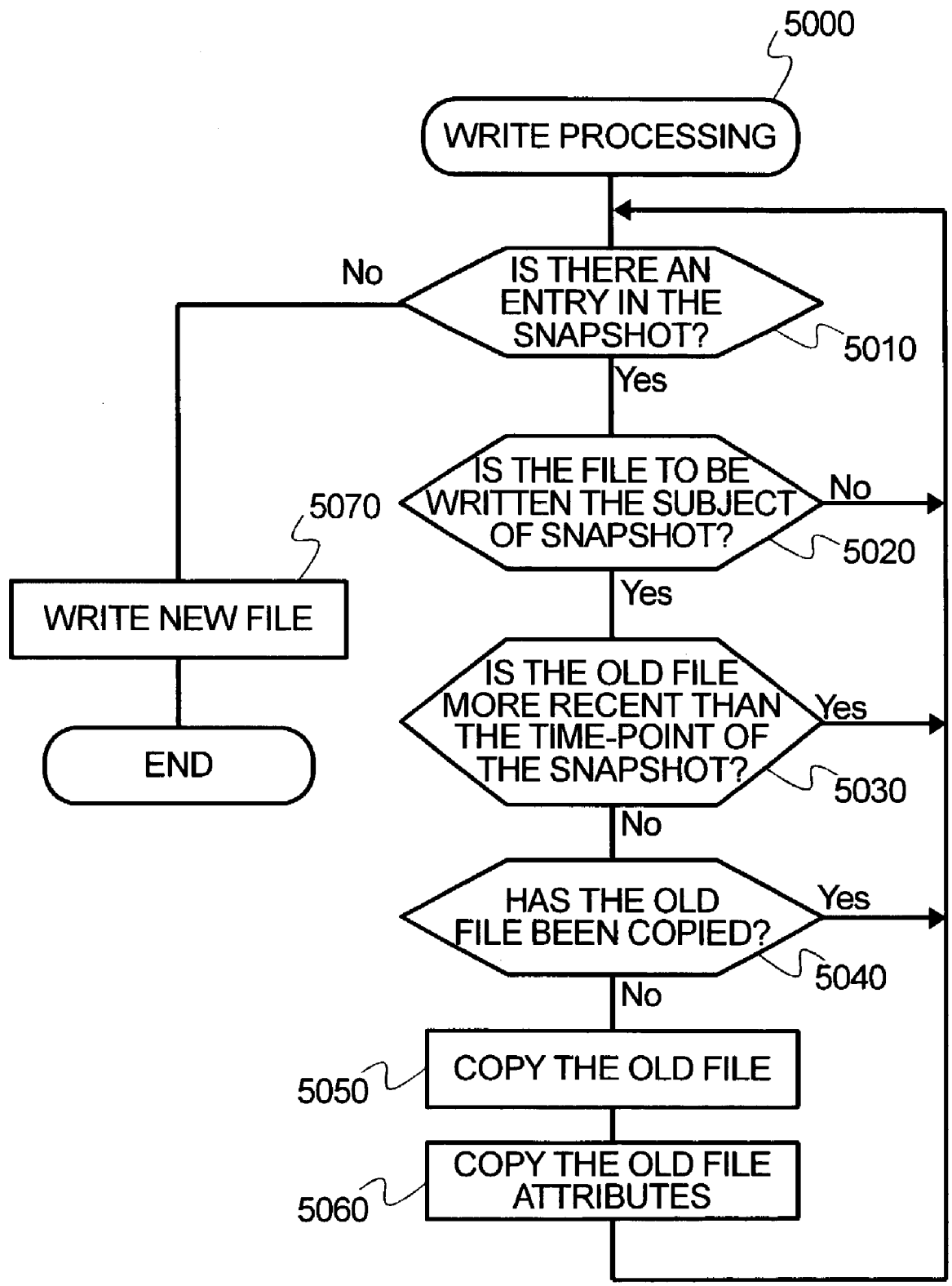
FIG. 6 is a flow chart of write processing.

FIG. 6 is a flow chart showing the procedure of write processing 5000 performed by executing the backup agent 1080 by the control section NASa or NASd. In this embodiment, it is assumed that the backup method is taking a snapshot of the directory. Consequently, in order to take a snapshot, the control section of NASa traps the write processing to the NAS and performs independent write processing by executing the backup agent 1080. The write processing 5000 is executed every time there is a write request to an NAS 1040.

First of all, the NAS 1040 searches for entries 1410 wherein the value of the flag entry 1420 of the snapshot table 1400 is 2 (step 5010). If such an entry 1410 exists, the NAS 1040 checks the source path a entry 1430 of the entry 1410 which has thus been found and checks to judge whether the file to be written (hereinbelow referred to as "new file") is included in a directory of which a snapshot is to be taken (step 5020). If the new file is not to be the subject of a snapshot, the NAS 1040 returns to the processing of step 5010, and searches for the next entry 1410.

If the new file is included in a directory of which a snapshot is to be taken, and if the data of the new file is updated by being overwritten, the NAS 1040 judges whether the time-point (hereinbelow called "wtime") at which the file that is being overwritten (hereinbelow called the "old file") was previously updated by being overwritten is more recent than the time-point registered in the snapshot time-point entry 1460 of the snapshot table entry 1410 corresponding to the directory of which a snapshot is being taken (step 5030).

If the time-point at which the old file was updated is more recent than the time-point at which the snapshot was taken, the NAS 1040 returns to the processing of step 5010.

If the time-point at which the old file was updated is earlier than the time-point at which the snapshot was taken, the NAS 1040 judges whether the old file has already been copied or not by acquiring the destination storage entry a1440 of the snapshot management table entry 1410 corresponding to the directory and the directory information indicated by he destination path a entry 1450 (step 5040).

If the old file has already been copied, the NAS 1440 returns to the processing of step 5010. On the other hand, if the old file has not yet been copied, the NAS 1040 copies the old file to the directory indicated by the information registered in the destination storage a entry 1440 and destination path a entry 1450 (step 5050). In addition, the NAS 1040 aligns the attribute information (time stamp, access rights etc) of the copied file with the attribute information of the old file (step 5060). After this, the NAS 1040 performs the processing of step 5010.

If, in step 5010, it is found that there is no entry in the snapshot, the NAS 1040 writes the new file to the corresponding disk device (step 5070) and terminates the write processing 5000. In this way, updating of data during the creation of the snapshot can be excluded.

Figure 7:
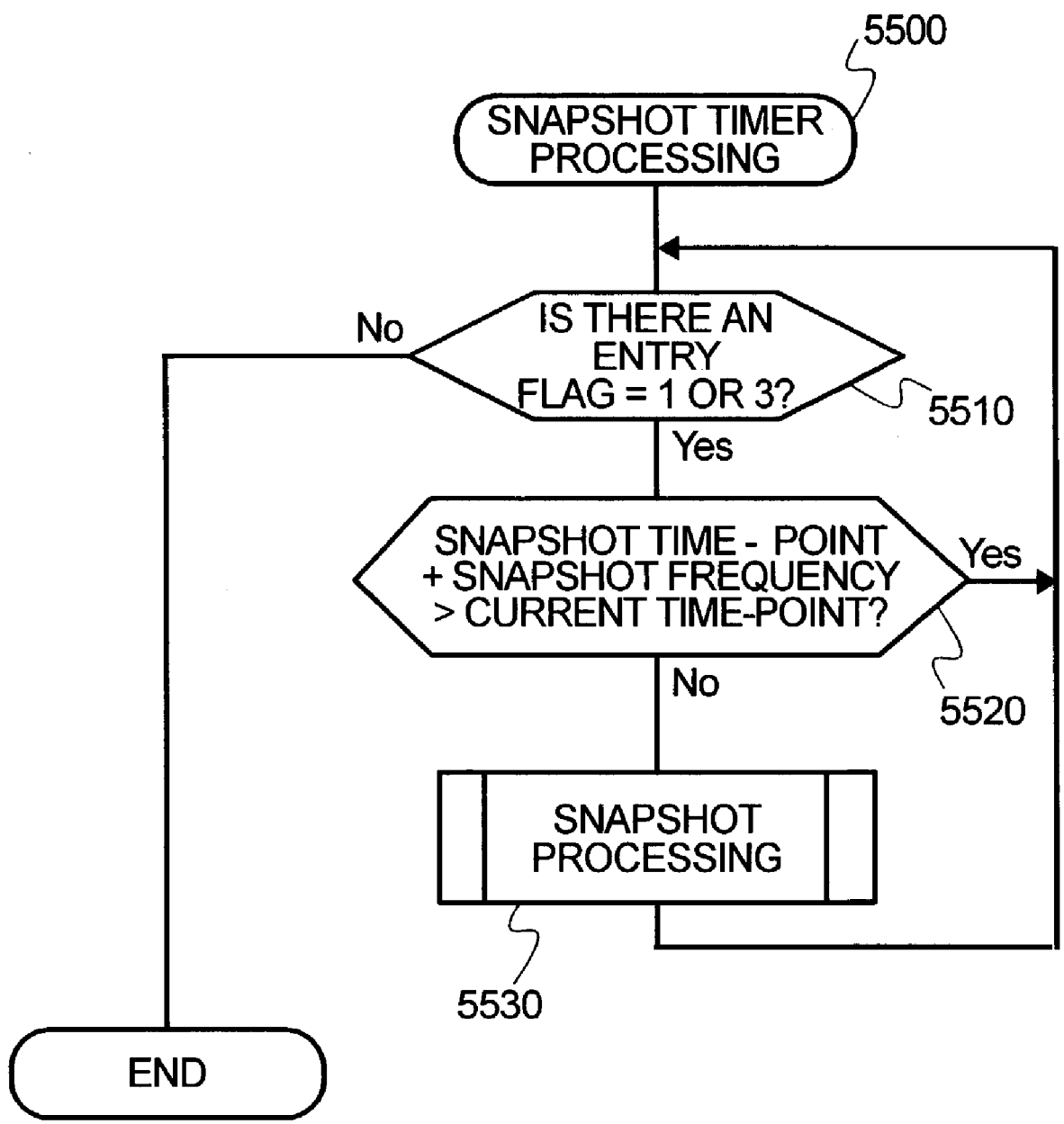
FIG. 7 is a flow chart of snapshot timer processing.

FIG. 7 is a flow chart of the snapshot timer processing 5500 that is performed by the NASa and NASd executing the backup agent 1080. This processing is actuated once every minute by the timer and consists in processing for judging, from the snapshot table 1400, whether or not some snapshot process exists that should be executed at that time point and, if so, giving instructions for execution of such snapshot processing.

The NAS 1040 searches for snapshot table entries 1410 wherein the value of the flag entry 1420 of the entry 1410 of the snapshot table 1400 is 1 or 3, meaning that entries in respect of which a snapshot is not currently being created (step 5510). If there are none such, the NAS 1040 terminates the snapshot timer processing 5500.

If a snapshot table entry 1410 is found whose value of the flag entry 1420 is 1 or 3, the NAS 1040 judges whether the time-point obtained by adding the time-point stored in the snapshot time-point entry 1460 and the snapshot frequency entry 1470 of the entry 1410 in question is earlier than or later than the current time-point (step 5520). If this time-point obtained by addition is earlier than the current time-point, the NAS 1040 returns to the processing of step 5510. If this time-point obtained by addition is later than the current time-point, the NAS 1040 performs the snapshot processing 6500, before returning to the processing of step 5510 (step 5530).

Figure 8:
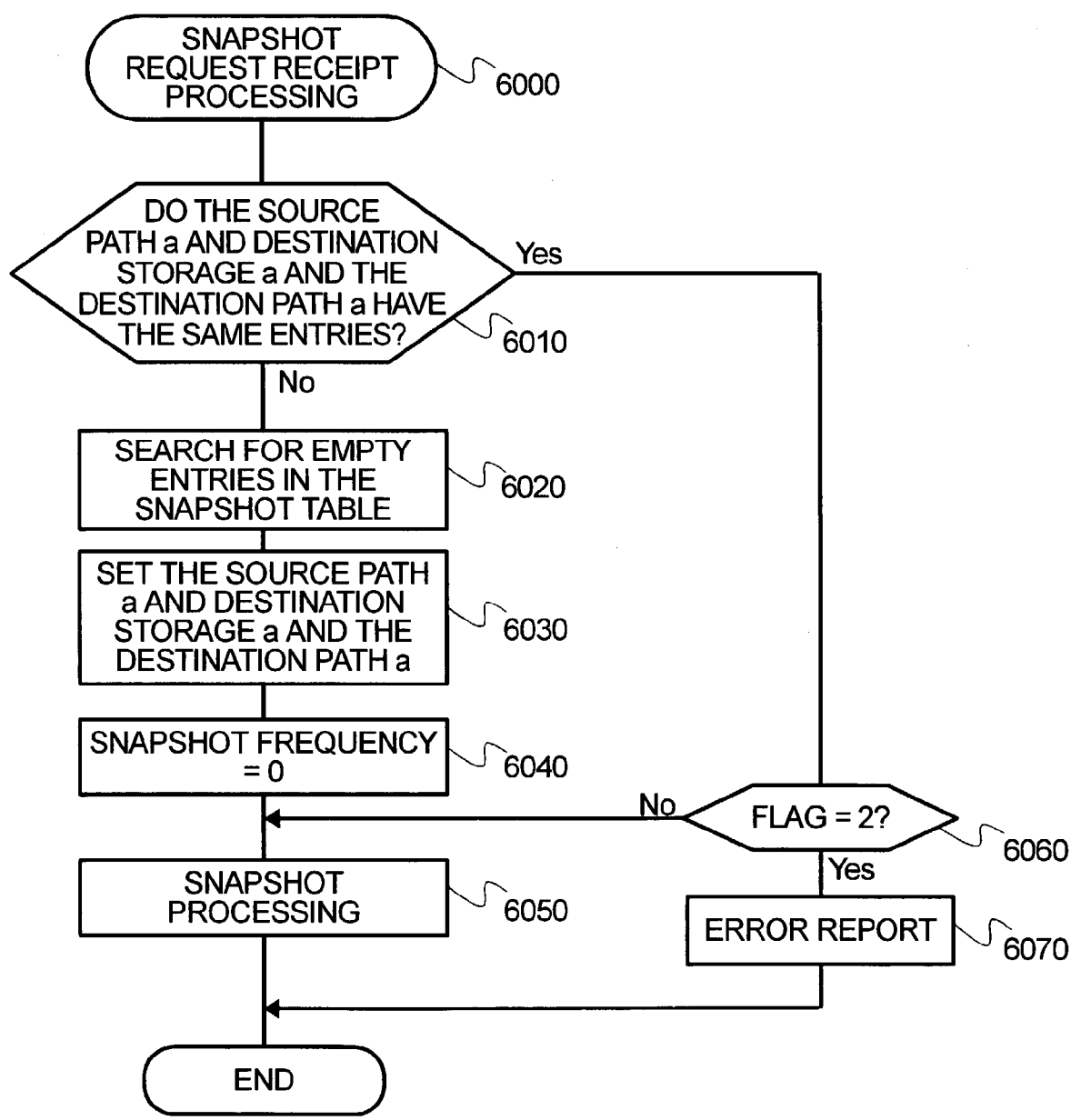
FIG. 8 is a flow chart of snapshot request receipt processing.

FIG. 8 is a flow chart of the snapshot request receipt processing 6000 performed by executing the backup agent 1080 by the NAS 1040. This processing is actuated by the NAS 1040 if there is a snapshot instruction from the administration console 1010.

The administration console 1010 designates to the NAS 1040 that is performing the snapshot the path of the directory that is the source of the snapshot and the NAS and directory path that are the snapshot destination.

The NAS 1040 that has received from the administration console 1010 designation of the directory path that is the source of the snapshot and designation of the NAS and directory path that are the destination of the snapshot looks up the source path a entry 1430, destination storage a entry 1440 and destination path a entry 1450 of the respective snapshot table entries 1410 of the snapshot table 1400 to judge whether there is any such entry 1410 that matches the instructions from the administration console 1010 (step 6010).

If no entry 1410 matches the instructions, the NAS 1040 searches the snapshot table 1400 to find an empty entry 1410, whose flag entry 1420 is 0. In this embodiment, for simplicity, it will be assumed that there is always an empty entry 1410. However, if no empty entry 1410 is found, an error report may be made by the NAS 1040 to the administration console 1010 (step 6020).

Once the NAS 1040 has found an empty entry 1410, the NAS 1040 registers the designation information received from the administration console 1010 in the source path a entry 1430, destination storage a entry 1440 and destination path a entry 1450 of the empty entry 1410 (step 6030).

After this, the NAS 1040 sets the value of the snapshot frequency entry 1470 of the empty entry 1410 to 0 (step 6040). The NAS 1040 then terminates the snapshot request receipt processing 6000 (step 6050) by performing snapshot processing 6500.

If a matching entry 1410 is found in step 6010, the NAS 1040 judges whether the value of the flag entry 1420 of the matching entry 1410 is 2 (step 6060). If the value is 2, no new snapshot processing can be executed during performance of the snapshot processing that is already in course of execution in respect of the directory corresponding to this entry 1410, so the NAS 1040 terminates the snapshot request receipt processing 6000 by issuing an error report to the administration console 1010 (step 6070).

If the value is other than 2, the NAS 1040 performs snapshot processing 6500 in step 6050.

Figure 9:
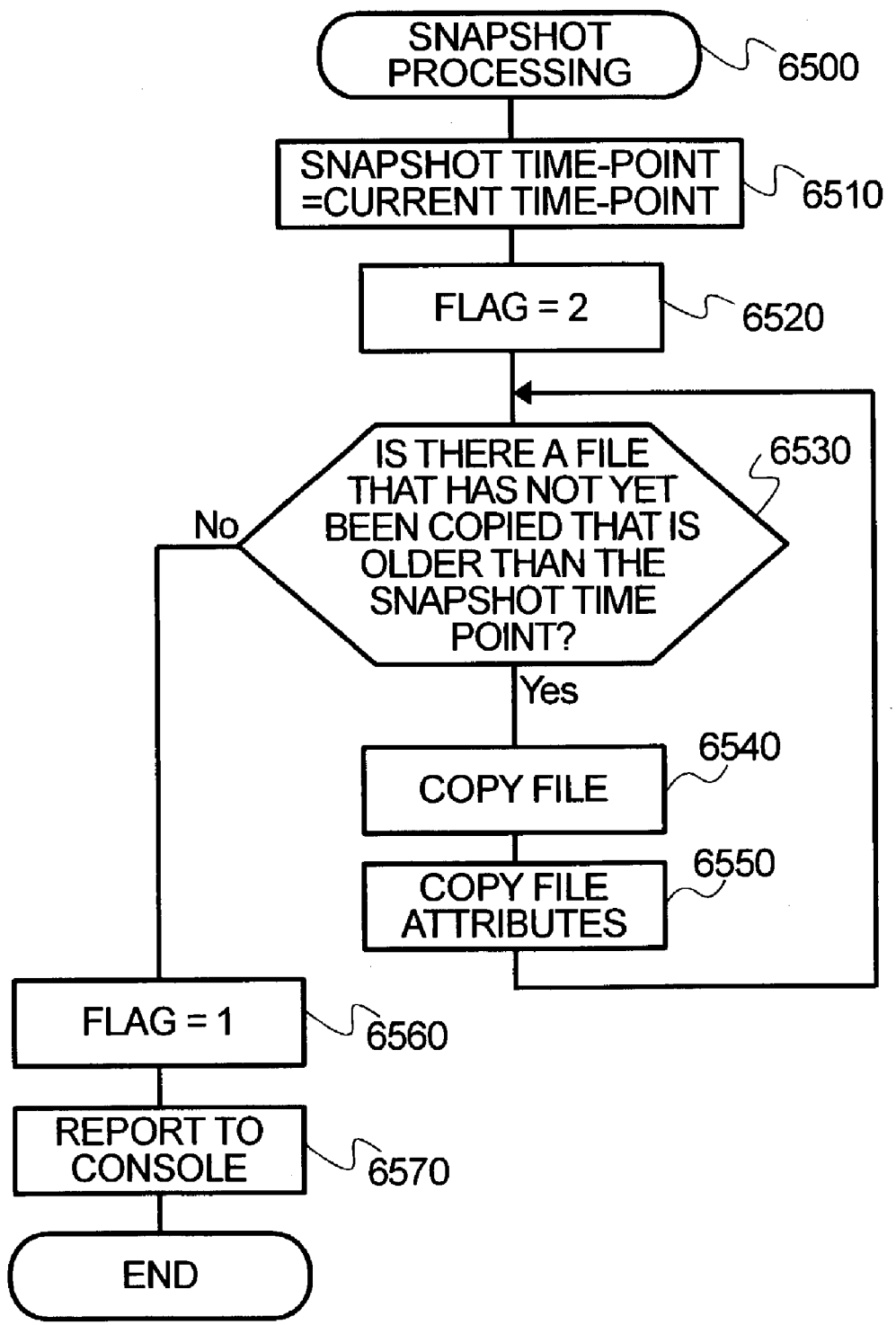
FIG. 9 is a flow chart of snapshot processing.

FIG. 9 is a flow chart of the snapshot processing 6500 that is performed by executing the backup agent 1080 by the NAS 1040.

The snapshot processing 6500 is executed when a snapshot table entry 1410 is designated by the snapshot timer processing 5500 or the snapshot request receipt processing 6000.

The NAS 1040 sets the current time point in the snapshot time-point entry 1460 of the designated entry 1410 (step 6510), sets 2 in the flag entry 1420 thereof and sets this entry 1410 in the snapshot (step 6520).

After this, the NAS 1040 compares the directory of the other NAS 1040 indicated by the information stored in the destination storage a entry 1440 and the destination path a entry 1450 of the entry 1410 in question with the snapshot source directory and determines whether any file that has not yet been copied that is older than the time-point registered in the snapshot time-point entry 1460 is present in the snapshot source directory (step 6530).

If such a file that has not yet been copied is present, the NAS 1040 copies this file that has not yet been copied to another snapshot destination NAS 1040 (step 6540). After this, the NAS 1040 instructs the copy destination NAS 1040 to set the attribute information of the copy source in the attribute information (time stamp, access rights etc) of the copy destination file (step 6550). After this, the NAS 1040 searches for the next file that has not yet been copied (step 6530).

If the NAS 1040 finds in step 6530 that no file that has not yet been copied exists, the NAS 1040 sets the value of the flag entry 1420 of the entry 1410 in question to 1 and sets the condition of the entry 1410 in question to the "snapshot completed" condition (step 6560). The NAS 1040 then sends information relating to the snapshot source NAS (itself) and the information stored in the source path a entry 1430, destination storage a entry 1440, destination path a entry 1450 and snapshot time-point entry 1460 of the entry 1410 in question to the administration console 1010 and reports completion of the snapshot processing 6500 to the administration console 1010, thereby terminating the snapshot processing 6500 (step 6570).

Figure 10:
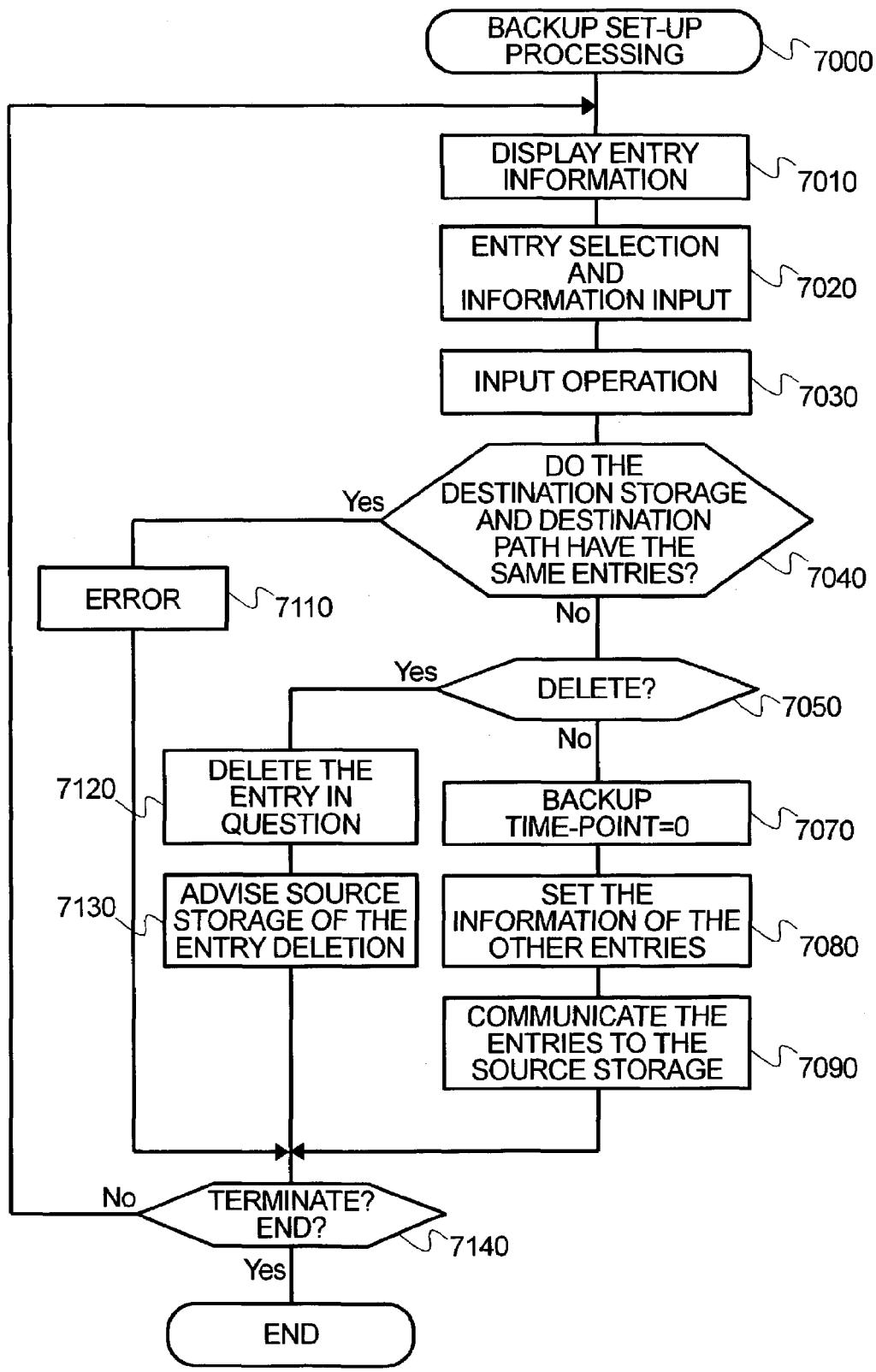
FIG. 10 is a flow chart of backup set-up processing.

FIG. 10 is a flow chart of the backup set-up processing 7000 that is performed by the administration console 1010 by executing the backup manager 1020. By means of this processing, the administrator of the computer system 1000 can set up data backup (snapshots) between NAS's 1040, using the administration console 1010.

In response to a request by the administrator, the administration console 1010 displays on the display unit of the administration console 1010 (step 7010) the information of entries 1210 registered in the backup management table 1200. The administrator then selects one entry 1210 and inputs information corresponding to the source storage entry 1220, source path entry 1230, destination storage entry 1240, destination path entry 1250 and backup frequency entry 1270.

If the administrator has selected an entry 1210 in which information is already stored, it is arranged that the administrator is unable to perform any operation at this point other than deletion of the entry 1210. If therefore the administrator wishes to correct the information of an entry 1210, the administrator must first delete the entry 1210 and then create a fresh entry 1210. At this time-point, the information whose input to the entry 1210 has been designated is not yet reflected to the backup management table 1200. On subsequently receiving instructions from the administrator (confirmation of input content), the administration console 1010 executes the operation designated by the administrator in respect of the entry 1210. Types of operation include creation of a new entry 1210 and deletion thereof (steps 7020, 7030).

Next, the administration console 1010 judges whether any entry 1210 whose destination storage entry 1240 and destination path entry 1250 are the same as the entry 1210 that has been thus input is already present in the backup management table 1200 (excluding identical entries for rewriting) (step 7040).

If no identical entry 1210 is found by the administration console 1010, the administration console 1010 judges whether the operation designated by the administrator is a deletion (step 7050). If the operation designated by the administrator is not a deletion, the administration console 1010 sets the backup time-point entry 1260 to 0 (signifying "not yet backed up") (step 7070) and sets up the information in respect of the source storage entry 1220, source path entry 1230, destination storage entry 1240, destination path entry 1250 and backup frequency entry 1270 that has been input by the administrator (step 7080).

After this, the administration console 1010 communicates the information stored in the source path entry 1230, destination storage entry 1240, destination path entry 1250 and backup frequency entry 1270 to the NAS 1040 indicated by the information stored in the source storage entry 1220, and instructs this NAS 1040 to add this information to the corresponding entry 1410 (step 7090).

The administration console 1010 then uses the display unit to ask the administrator whether the processing has been completed (step 7140) and, if the processing has been completed, terminates the backup set-up processing 7000.

If, in step 7040, the administration console 1010 finds that a corresponding entry 1210 exists, the administration console 1010 makes an error report to the administrator using the display unit and performs the processing of step 7140 (step 7110).

In step 7050, if the administration console 1010 ascertains that the operation is deletion, the administration console 1010 registers a value indicating null in the source storage entry 1220, source path entry 1230, destination storage entry 1240 and destination path entry 1250 of the designated entry 1210, and registers 0 in the backup time-point entry 1260 and backup frequency entry 1270. In this way, the entry 1210 in question is deleted (step 7120).

After this, the administration console 1010 communicates the information corresponding to the deleted entry 1210 to the NAS 1040 indicated by the source storage entry 1240 of this entry and instructs this NAS 1040 to perform deletion of the corresponding entry 1410 and to shift to the processing of step 7140 (step 7130).

Figure 11:
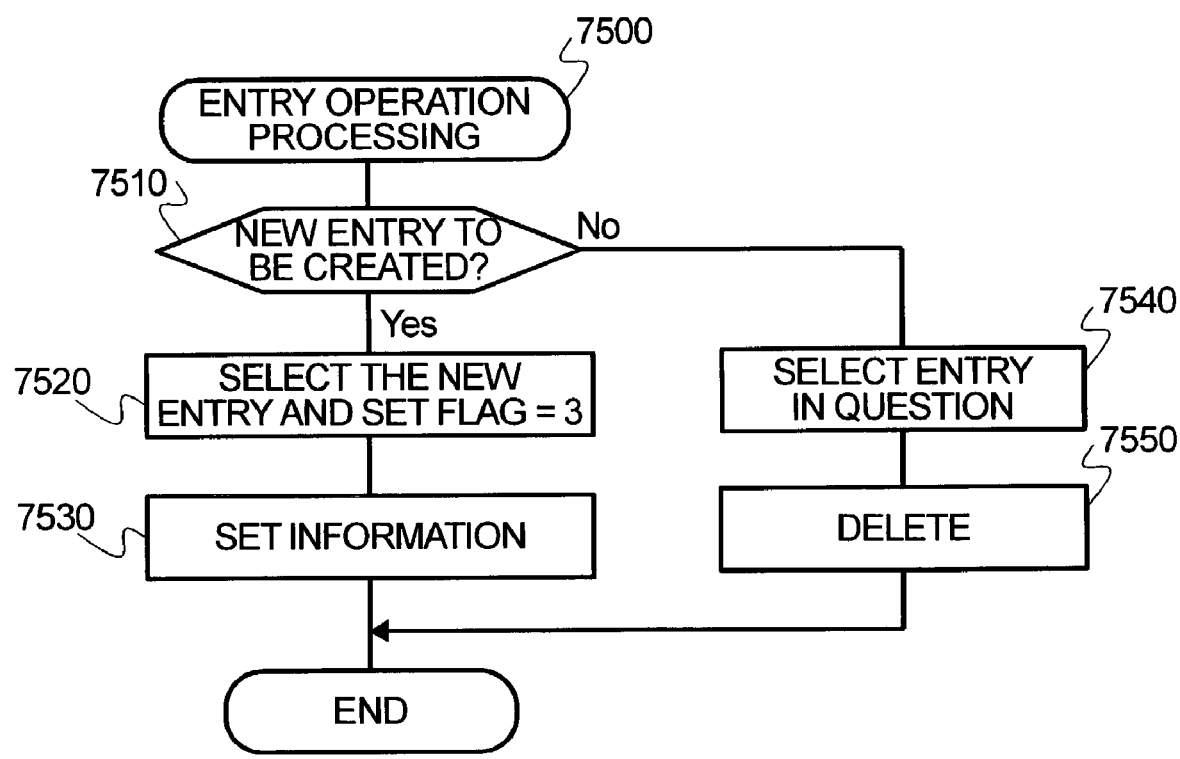
FIG. 11 is a flow chart of entry operation processing.

FIG. 11 is a flow chart of the entry operation processing 7500 performed by the NAS 1040 when the administration console 1010 instructs the NAS 1040 to perform an entry operation in accordance with the step 7090 or step 7130 of the backup set-up processing 7000.

First of all, the NAS 1040 judges whether the instruction from the administration console 1010 is an instruction for creating a new entry 1410 (step 7510). If the instruction from the administration console is an instruction for creating a new entry 1410, the NAS 1040 selects an empty entry whose flag entry 1420 is 0 from the entries 1410 of the snapshot table 1400 and sets the value of its flag entry 1420 to 3. It is assumed at this point that an empty entry will always be found (step 7520).

After this, the NAS 1040 registers the information designated by the administration console in the source path a entry 1430, destination storage a entry 1440, destination path a entry 1450 and snapshot frequency entry 1470 of the selected entry 1410. Also, the NAS 1040 terminates the entry operation processing 7500 by initializing the snapshot time-point entry 1460 of the selected entry 1410 to 0 (step 7530).

In step 7510, if the NAS 1040 ascertains that the instruction from the administration console is not an instruction to create a new entry, the NAS 1040 selects an entry 1410 whose values of the source path a entry 1430, destination storage a entry 1440 and destination path a entry 1450 match the values contained in the instruction (step 7540). After this, the NAS 1040 sets the values of the source path a entry 1430, destination storage a entry 1440 and destination path a entry 1450 of the selected entry 1410 to null and sets the values of the flag entry 1420, snapshot time-point entry 1460 and snapshot frequency entry 1470 to 0, thereby deleting the entry 1410, and terminates the entry operation processing 7500 (step 7550).

The administration console 1010 instructs an NAS 1040 to perform snapshot processing by the following procedure.

First of all, the administration console 1010 displays the information of entries 1210 of the backup management table 1200 on the display unit of the administration console 1010. The administrator selects one of the displayed entries 1210 as a pair for taking a snapshot and inputs the result of this selection to the administration console 1010. When it receives this input from the administrator, the administration console 1010 sends a command giving instructions for taking a snapshot and the information stored in the source path entry 1230, destination storage entry 1240 and destination path entry 1250 of the selected entry 1210 to the NAS 1040 corresponding to the content of the source storage entry 1220 of the selected entry 1210.

The administration console 1010 processes a report of termination of the snapshot from the NAS 1040 in accordance with the following procedure.

First of all, the administration console 1010 receives a report of completion of the snapshot from the NAS 1040. After this, the administration console 1010 selects an entry 1210 wherein the information relating to the NAS 1040 in respect of which a report has been received, the source path entry 1230 in respect of which a report has been received, the destination storage entry 1240 and the destination path entry 1250 respectively match the source storage entry 1220, source path entry 1230, destination storage entry 1240 and destination path entry 1250 of the backup management table entry 1210. After this, the administration console 1010 terminates the processing by setting the reported value of the snapshot time-point entry 1460 as the backup time-point entry 1260 of the selective entry 1210.

Figure 12:
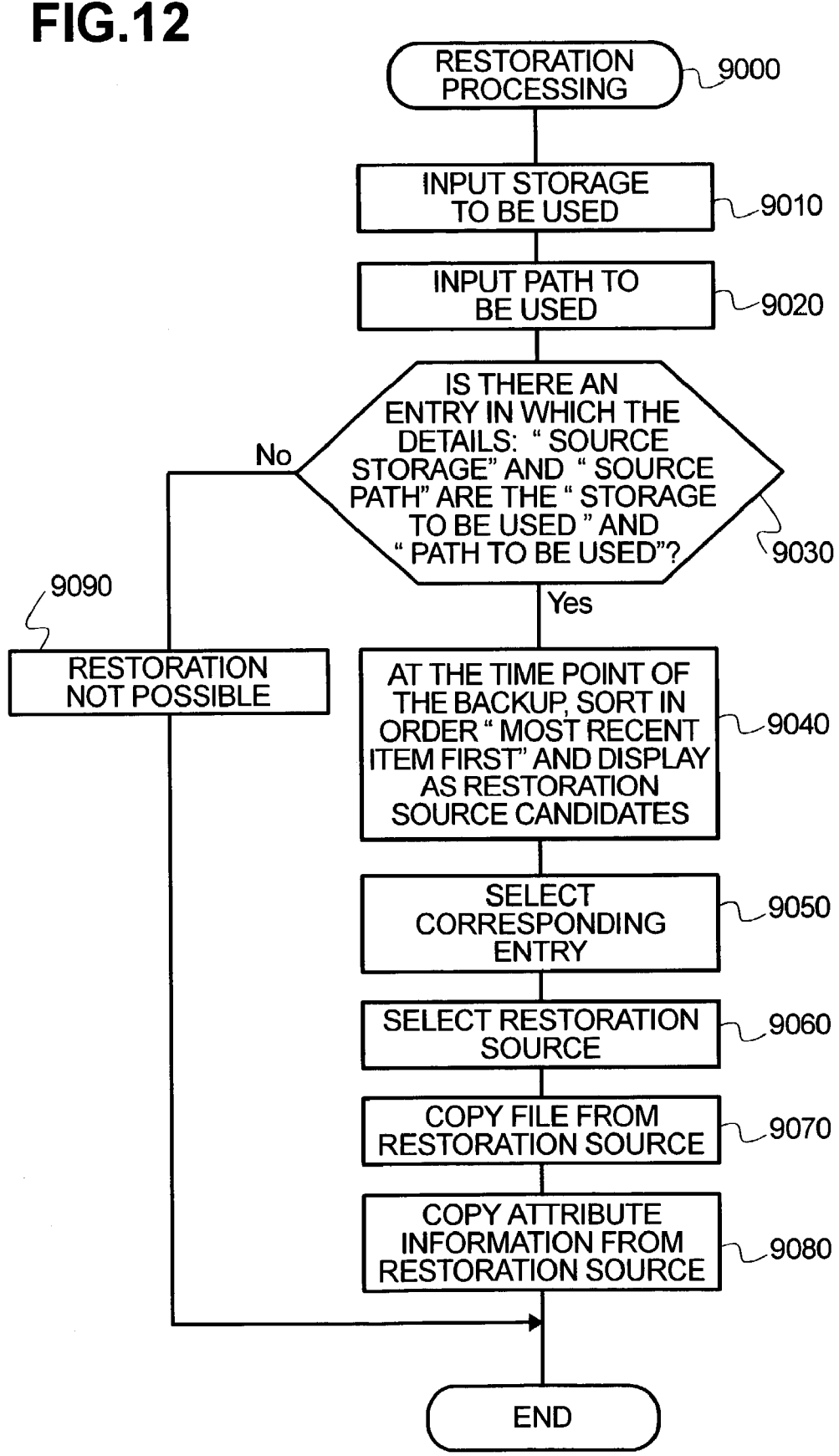
FIG. 12 is a flow chart of restoration processing.

FIG. 12 is a flow chart of the restoration processing 9000 whereby a source directory is restored from a backup destination directory when for example the files of the directory that was the source of the backup have been destroyed due for example to a mistaken operation by a user. The restoration processing 9000 is performed by the administration console 1010 executing the backup manager 1020 under instructions from the administrator.

In this embodiment, as shown in FIG. 4, there are a plurality of backup (snapshot) destinations. In this embodiment, the administration console 1010 displays the respective backup destinations on the display unit together with the time point at which the snapshots were taken. The administrator then restores the directory by selecting one of these.

First of all, the administrator inputs (steps 9010, 9020) the information of the NAS 1040 and directory that are to be restored to the administration console 1010. The administration console looks up all of the backup management table entries 1210 for which the NAS 1040 input by the administrator matches the information stored in the source storage entry 1220 and for which the input directory matches the information stored in the source path directory 1230.

If matching entries 1210 are found, the administration console 1010 rearranges the entries 1210 that are found in order of latest time of registration in the backup time-point entry 1260 and displays the entries 1210 that are found on the screen as restoration source directory candidates (step 9040). The administrator selects a single entry 1210 from among the displayed candidates (step 9050).

After this, the administration console 1010 identifies the entry 1210 selected by the administrator as the restoration source entry 1210 (step 9060). The administration console 1010 then instructs an NAS 1040 where there is a restoration source directory to copy the files stored in the directory indicated by the information stored in the destination storage entry 1240 and destination path entry 1250 of the selected entry 1210 into a directory designated by the administrator. The administration console 1010 then issues an instruction to the NAS 1040 to align the attribute information (time stamp and access rights etc) of the copied file with that of the restoration source file, and terminates the restoration processing 9000 (step 9080).

If no matching entry 1210 is found in step 9030, the administration console 1010 notifies the administrator that restoration is not possible (step 9090) and terminates the restoration processing 9000.

As described above, with this embodiment, if backup and the like processes are performed between a plurality of NAS, the backup processing is performed in a centralized fashion by the administration console connected with the network. The administrator can therefore easily perform management of backups of the data of NAS that are connected with the network.

In the first embodiment, backup and restoration of a directory were performed between NAS. In the second embodiment, instead of NAS 1040, backup and restoration are performed in volume units between storage sub-systems having disk devices that are connected by fiber channels or the like, in which access is performed in block units.

In this embodiment, a snapshot function is employed for backup between disk devices. However, the present invention can be applied not merely in the case where a snapshot is performed between disk devices but can also be employed for performing snapshots at suitable times with a remote copy destination disk device, once remote copying has been performed between the disk devices.

The chief difference from the first embodiment is that, in FIG. 1, disk devices (disk devices a, b, c, d) that are accessed in block units are employed as storage sub-systems, instead of NAS. The snapshot unit is therefore a volume rather than a file or directory. Also, the network that is employed is changed to a network for block access. Also, since a volume does not have information corresponding to the file attribute information, the processing for manipulating file attributes that was performed in the first embodiment is not necessary in this embodiment.

Figure 13:
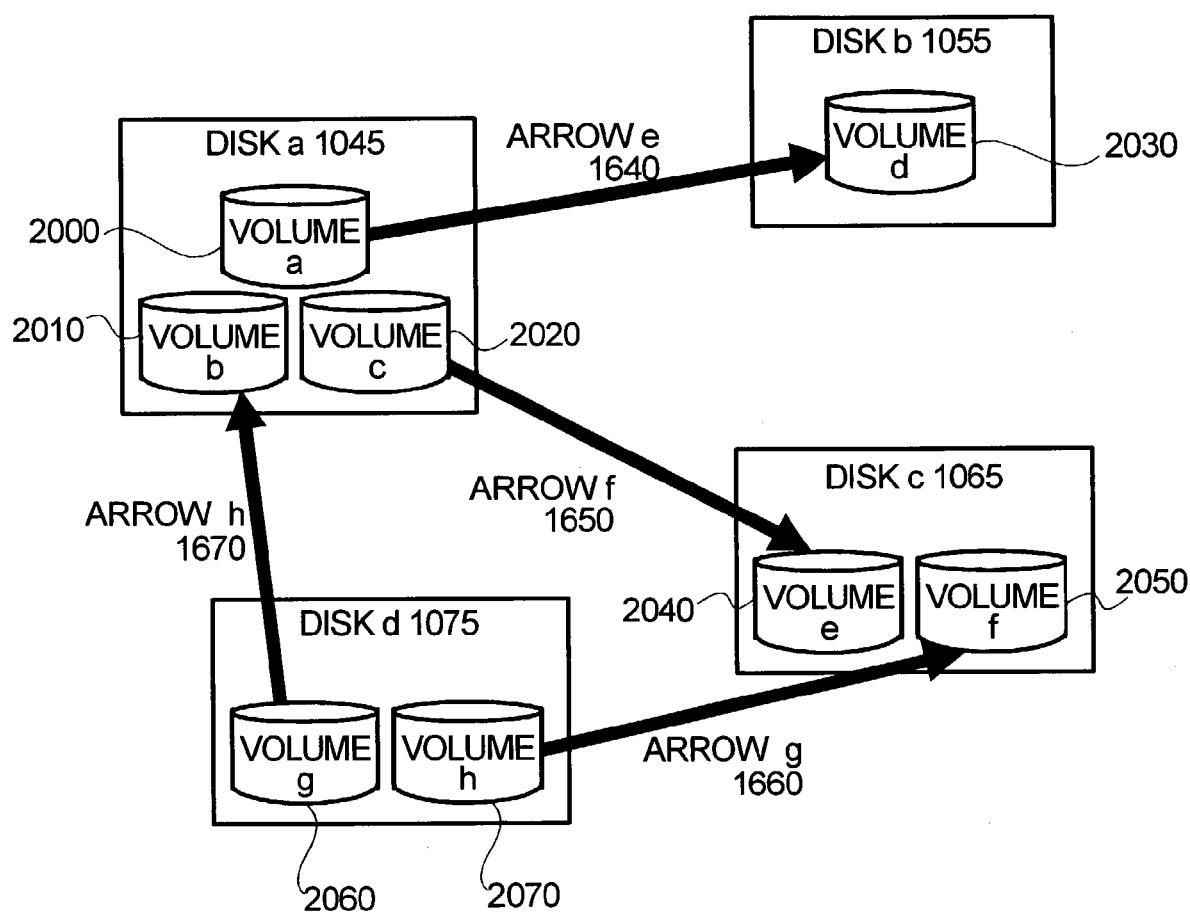
FIG. 13 is a view showing the backup relationship between disks.

FIG. 13 is a view corresponding to FIG. 4 of the first embodiment showing the backup relationship between disk devices.

FIG. 14 is a specific example of a backup management table 1200 according to this embodiment. The difference from the first embodiment is that information indicating the volume name is stored under the disk device name and source path entry 1230 in the source storage entry 1220.

The arrow e1640 of FIG. 13 corresponds to the entry e1840 of FIG. 14 and signifies that the volume a2000 in the disk device 1045*a* is backed up (a snapshot is taken) every 10 minutes to the volume d2030 of the disk device 1045*b*.

Likewise, the arrow f1650 of FIG. 13 corresponds to the entry f1850 of FIG. 14 and signifies that the volume c2020 of the disk device 1045*a* is backed up every 100 minutes to the volume e2040 of the disk device 1045*c*.

The arrow g1660 of FIG. 13 corresponds to the entry g1860 of FIG. 14 and indicates that the volume g2060 of the disk device 1045*d* is backed up to the volume b2010 of the disk device 1045*a*. Backup corresponding to this entry is not performed periodically.

The arrow h1670 of FIG. 13 corresponds to the entry h1870 of FIG. 14 and signifies that the volume h2070 of the disk device 1045*d* is backed up every 30 minutes to the volume f2050 of the disk device 1045*a*.

With the present invention, backup data distributed to a plurality of storage sub-systems can easily be managed.

What is claimed is:

1. A computer coupled to a plurality of storage sub-systems via a network, comprising:
    a memory that stores information for management of copying of data between individual ones of said plurality of storage sub-systems; and
    a control unit;
    wherein said control unit gives a first instruction to a first storage sub-system of the plurality of storage sub-systems for copying data from the first storage sub-system to a second storage sub-system of the plurality of storage sub-systems, by referring to said information of management stored in said memory, and gives a second instruction to the second storage sub-system for copying data from the second storage sub-system to the first storage sub-system, by referring to said information for management stored in said memory, such that management of said copying between said first and second storage sub-systems is consolidated in said computer by said control unit referring to said memory;
    wherein said control unit displays a list of the first and the second storage sub-systems as destination storage sub-systems in order of time at which a copy processing in accordance with each of the first and second instructions was executed in accordance with said information for management stored in said memory;
    wherein said control unit gives instructions to the second storage sub-system to transfer data stored in said second storage sub-system to a third storage sub-system of the plurality of storage sub-systems;
    wherein said second storage sub-system is selected by a user from the list of said storage systems displayed by said control unit;
    wherein the control unit treats the first storage sub-system as a source storage sub-system and the second storage sub-system as a destination storage sub-system if the control unit gives the first instruction to the first storage sub-system, and treats the second storage sub-system as a source storage sub-system and the first storage sub-system as a destination storage sub-system if the control unit gives the second instruction to the second storage sub-system;
    wherein the information stored in the memory includes back up time point information which indicates a first time when a most recent copying of data from the first storage sub-system to the second storage sub-system is finished in response to the first instruction, and a second time when a most recent copying of data from the second storage sub-system to the first storage sub-system is finished in response to the second instruction;
    wherein the control unit displays the list in accordance with the first time and the second time;
    wherein the first and second storage sub-systems are network attached storage;
    wherein data copied between the first and the second storage sub-systems are one or more files;
    wherein the first instruction includes first schedule information indicating a frequency of execution of copying data from the first storage sub-system to the second storage sub-system, and
    wherein the second instruction includes second schedule information indicating a frequency of execution of copying data from the second storage sub-system to the first storage sub-system.

2. A computer coupled to a plurality of storage sub-systems via a network, comprising:
    a memory that stores information for management of copying of data between individual ones of said plurality of storage sub-systems; and
    a control unit;
    wherein said control unit gives a first instruction to a first storage sub-system of the plurality of storage sub-systems for copying data from the first storage sub-system to a second storage sub-system of the plurality of storage sub-systems, by referring to said information of management stored in said memory, and gives a second instruction to the second storage sub-system for copying data from the second storage sub-system to the first storage sub-system, by referring to said information for management stored in said memory, such that management of said copying between said first and second storage sub-systems is consolidated in said computer by said control unit referring to said memory;
    wherein said control unit displays a list of the first and the second storage sub-systems as destination storage sub-systems in order of time at which a copy processing in accordance with each of the first and second instructions was executed in accordance with said information for management stored in said memory;
    wherein the first instruction includes first schedule information indicating a frequency of execution of copying data from the first storage sub-system to the second storage sub-system, and
    wherein the second instruction includes second schedule information indicating a frequency of execution of copying data from the second storage sub-system to the first storage sub-system.

* * * * *